INVENTOR.
BY ALBERT E. BRENDEL
WILSON, SETTLE, BATCHELDER
ATT'YS. & CRAIG

United States Patent Office 3,426,589
Patented Feb. 11, 1969

3,426,589
TENSION TRANSDUCER
Albert E. Brendel, Roseville, Mich., assignor to Lebow Associates, Inc., Oak Park, Mich., a corporation of Michigan
Filed July 18, 1966, Ser. No. 566,162
U.S. Cl. 73—144
Int. Cl. G01l 5/04
3 Claims

ABSTRACT OF THE DISCLOSURE

A transducer for measuring cable tension. An elongate beam is provided with cable-engaging support members ranged on opposite sides of a reduced central section in a fashion such that tensioning of the cable induces a proportionate bending moment on the central section which may be readily measured by an electrical strain gage system.

---

It is an object of this invention to provide apparatus for measuring tension in a flexible load carrying member such as a cable or strap in a simple and accurate manner.

Another object of the invention is to provide an apparatus for measuring tension in a flexible load carrying member in a manner which is independent on the thickness of the load carrying member.

Other objects of this invention will appear in the following description and appended claims, reference being had to the accompanying drawings forming a part of this specification wherein like reference characters designate corresponding parts in the several views.

On the drawings

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings

Figure 1:
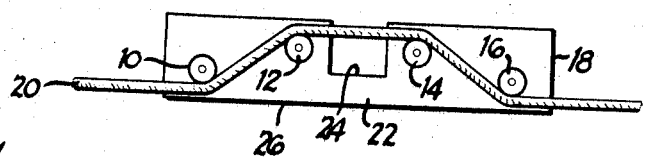
FIGURE 1 is a schematic drawing of a measuring device through which a load carrying member is deflected according to one embodiment of the invention.
Figure 2:
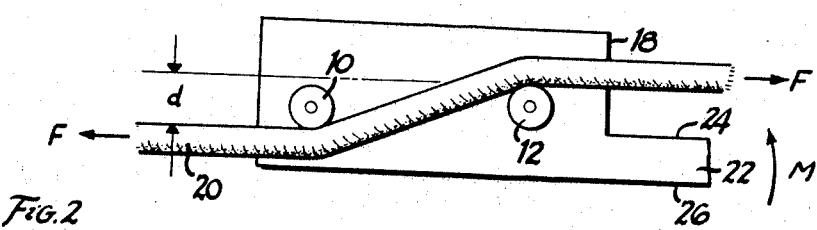
FIGURE 2 is a free body diagram of one-half of the device of FIGURE 1.

In the embodiment of the invention illustrated in FIGURES 1 and 2, there are four support members 10, 12, 14 and 16 affixed to a common base 18. The support members may be posts attached to or integral with the common base 18, or they may be pulleys affixed to the common base 18. The flexible load carrying member in this embodiment is a cable 20 which is deflected through the support members in the manner shown in FIGURE 1.

As viewed in FIGURE 1, the cable 20 passes along the lower side of the support members 10 and 16 and passes along the upper side of support members 12 and 14. Members 12 and 14 are between and offset from support members 10 and 16 so that the cable 20 is offset as shown as it passes through the support members. The base member 18 has a reduced section 22 at a central portion thereof, and measurements are made in this reduced section as will be explained. The reduced section 22 acts as a stressed beam and presents a simple area suitable for gaging between the two central support members 12 and 14.

Figure 5:
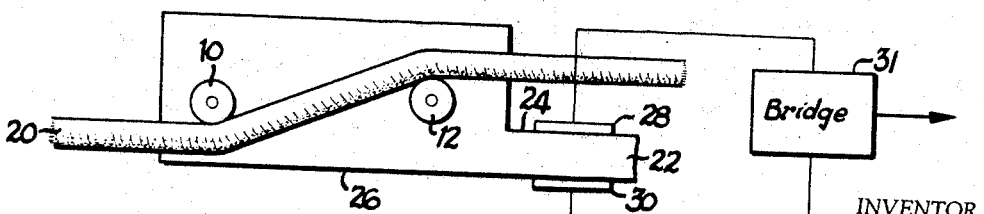
FIGURE 5 is a fragmentary view showing schematically how strain gages may be applied to a section of the measuring device.

Assuming that the tension force in the cable acts at the center of the cable, the free body diagram of FIGURE 2 shows that the restraining moment $M$ through the reduced central section 22 is equal to the tension force $F$ times the offset distance $d$ plus the cable thickness $t$. Thus, $M = F(d+t)$. Strain gages can be affixed to the reduced section 22 and can be wired to give an electrical output proportional to the moment $M$ which in turn is protional to the applied force $F$ which is the tension in the cable. Suitable strain gages for this purpose are well known in the art. As shown in FIGURE 5, one such strain gage 28 may be affixed to the upper surface 24 of reduced section 22 and another strain gage 30 may be affixed to the bottom surface 26 of the reduced section. Outputs from the strain gages may be combined as in a Wheatstone bridge circuit 31 so as to give an overall output which is proportional to the moment $M$ which in turn is proportional to the applied force $F$ which is the tension in the cable.

A feature of the measuring device in accordance with FIGURES 1 and 2 is the fact that the structure has a simple stressed beam (reduced section 22) where it is easy to make measurements with strain gages. It may be noted, however, that the output which is obtained is dependent on the thickness of the cable. Thus, if the diameter of the cable changes as a function of applied force, the output sensed by measuring the moment $M$ will also change as a function of both the tension and the cable thickness, thus causing inaccuracies in the system. It is desirable to minimize the offset distance $d$ in order to decrease the force on the measuring structure and the deflection of the cable. However, as the distance $d$ decreases, the moment $M$ becomes more dependent on cable thickness which again leads to inaccuracies.

Figure 3:
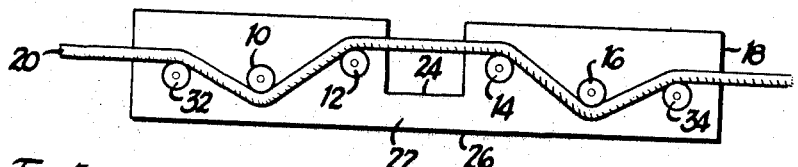
FIGURE 3 is a schematic drawing of a modification of the measuring device of FIGURE 1 which constitutes another embodiment of the invention.
Figure 4:
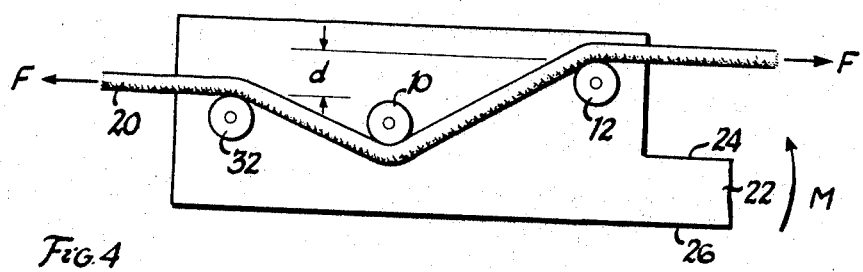
FIGURE 4 is a free body diagram of one-half of the device of FIGURE 3.

The embodiment of FIGURES 3 and 4 represents an improvement over the embodiment of FIGURES 1 and 2 in that the output obtained from the measuring device is not dependent upon cable thickness. Parts of the device of FIGURES 3 and 4 which are the same as corresponding parts FIGURES 1 and 2 have the same reference numerals applied to them. Thus, it may be seen clearly that the support members 10, 12, 14 and 16 are arranged the same as the corresponding members in FIGURES 1 and 2. However, there are two further support members 32 and 34 which are located in such a manner as to have the cable contact the support members 32 and 34 on the same side as support members 12 and 14. Members 32 and 34 are in a substantially straight line relation with members 10 and 16, but this is not essential. Portions of the load carrying member 20 located outwardly from support members 10 and 16 are passed along the upper sides of support members 32 and 34. As in FIGURES 1 and 2, the load carrying member 20 passes along the lower sides of support members 10 and 16 and along the upper sides of support members 12 and 14.

Assuming that the tension force in the cable acts at the center of the cable, the moment $M$ transmitted by the cable 20 to the reduced section 22 of the base 18 is independent of cable thickness because the offset distance variation due to cable thickness changes cancels when the moment in the reduced section is calculated. The formula for the moment $M$ is: $M = Fd$.

The moment $M$ is measured in the reduced section 22 by strain gages is exactly the same manner as has been described in connection with FIGURES 1, 2 and 5. Since the cable thickness no longer affects the output of the strain gages, the actual offset $d$ can be made much smaller without affecting system accuracy. The advantages realized by making the offset distance $d$ minimal are:

(1) Cable shortening resulting from deflecting the cable through the measuring device is minimized.

(2) Stress concentrations in the cable are minimized.

(3) Forces carried in the measuring structure are minimized.

Thus, the invention provides an effective method of measuring tension in a flexible load carrying member by the use of a measuring structure to which strain gages may be easily affixed to provide an output which is proportional to the tension force. By a very slight variation of the basic method, it is possible to obtain measurement of the tension in a load carrying member which is not dependent on the thickness of the load carrying member. When the output is not dependent on cable thickness, the offset distance can be made much smaller without affecting system accuracy, and this has a number of advantages as set forth fully above.

Having described my invention, what I claim as new is:

1. Apparatus for measuring the tension applied to a cable comprising an elongate beam having a reduced central section and like integral opposite end sections, a plurality of cable-engaging support members mounted on each of said end sections and projecting outwardly from one side of said beam to deflect a cable extending longitudinally along said one side of said beam and engaged with said support members from a parallel relationship with the longitudal extent of said beam at each opposite side of said central section while maintaining the cable in parallel relationship with said beam in its extent across said central section, the engagement between said cable and said support members being operable to induce a bending moment in said central section upon the application of tension to said cable, and means for measuring the bending moment induced in said central section by the application of tension to a cable engaged on said support members.

2. Apparatus as defined in claim 1 wherein two support members are mounted upon each of said end portions in symmetrical relationship to said central section, said cable passing along one side of the support members adjacent said central section and passing along the opposite sides of the support members remote from said central section.

3. Apparatus as defined in claim 1 wherein three support members are mounted upon each of said end portions in symmertical relationship to said central section in longitudinally spaced relationship along said beam, said cable passing on one side of the two support members most closely adjacent said central section and passing on alternate opposite sides of the remaining support members.

References Cited

UNITED STATES PATENTS

| | | | |
|---|---|---|---|
| 2,795,136 | 6/1957 | Matt | 73—144 |
| 2,925,731 | 2/1960 | Cammack | 73—144 |
| 3,280,623 | 10/1966 | Saxl | 73—144 XR |

RICHARD C. QUEISSER, *Primary Examiner.*

CHARLES A. RUEHL, *Assistant Examiner.*

U.S. Cl. X.R.

73—88.5